United States Patent
Yamamura

(10) Patent No.: US 10,569,647 B2
(45) Date of Patent: Feb. 25, 2020

(54) DRIVING FORCE ADJUSTMENT APPARATUS

(71) Applicant: MITSUBISHI JIDOSHA KOGYO KABUSHIKI KAISHA, Tokyo (JP)

(72) Inventor: Takuya Yamamura, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 15/865,997

(22) Filed: Jan. 9, 2018

(65) Prior Publication Data
US 2018/0257484 A1    Sep. 13, 2018

(30) Foreign Application Priority Data
Mar. 8, 2017    (JP) ................... 2017-043444

(51) Int. Cl.
| | |
|---|---|
| *F16H 48/10* | (2012.01) |
| *B60K 17/16* | (2006.01) |
| *B60K 17/356* | (2006.01) |
| *F16H 48/24* | (2006.01) |
| *F16H 1/36* | (2006.01) |
| *F16H 48/36* | (2012.01) |

(Continued)

(52) U.S. Cl.
CPC .......... *B60K 17/165* (2013.01); *B60K 1/00* (2013.01); *B60K 17/356* (2013.01); *B60K 23/04* (2013.01);
(Continued)

(58) Field of Classification Search
CPC .. B60K 17/165; B60K 23/0808; B60K 23/04; B60K 1/00; B60K 17/356; F16H 48/08;
(Continued)

(56) References Cited

U.S. PATENT DOCUMENTS

| | | | | |
|---|---|---|---|---|
| 5,437,583 | A | * 8/1995 | Shibahata | B60K 23/04 475/151 |
| 7,867,125 | B2 | * 1/2011 | Kim | B60K 6/36 475/150 |

(Continued)

FOREIGN PATENT DOCUMENTS

| | | |
|---|---|---|
| JP | 2007-177915 A | 7/2007 |
| WO | WO 2015/169837 A1 | 11/2015 |

OTHER PUBLICATIONS

Extended European Seach Report dated Aug. 16, 2018 issued in corresponding EP Application No. 18156859.3.

*Primary Examiner* — Patrick H Mackey
(74) *Attorney, Agent, or Firm* — Birch, Stewart, Kolasch & Birch, LLP

(57) ABSTRACT

A first gear train couples one shaft with the left axle or the right axle. The one shaft is one of two shafts which are not coupled to the reduction gear. The other one of the two shafts is coupled with one element which are not coupled to the first gear train among three elements of the differential case, the left axle and the right axle. The planetary gear mechanism, first gear train and second gear train have a gear ratio by which rotation of a motor stops when the differential apparatus does not perform differential operation and total torque of the left axle and the right axle when torque of the motor is applied does not change. The motor is disposed at one side in a vehicle widthwise direction with reference to the differential apparatus, and a planetary gear mechanism is disposed at the other side.

4 Claims, 6 Drawing Sheets

(51) Int. Cl.
  *F16H 48/08* (2006.01)
  *B60K 23/08* (2006.01)
  *B60K 23/04* (2006.01)
  *B60K 1/00* (2006.01)

(52) U.S. Cl.
  CPC ........... *B60K 23/0808* (2013.01); *F16H 1/36* (2013.01); *F16H 48/08* (2013.01); *F16H 48/10* (2013.01); *F16H 48/24* (2013.01); *F16H 48/36* (2013.01); *B60K 2001/001* (2013.01); *B60K 2023/043* (2013.01); *B60K 2023/0833* (2013.01); *B60Y 2200/92* (2013.01); *B60Y 2400/421* (2013.01); *B60Y 2400/4244* (2013.01); *B60Y 2400/73* (2013.01); *F16H 2048/364* (2013.01)

(58) Field of Classification Search
  CPC . F16H 48/10; F16H 1/36; F16H 48/24; F16H 48/36
  See application file for complete search history.

(56) References Cited

U.S. PATENT DOCUMENTS

| | | | | |
|---|---|---|---|---|
| 8,182,386 | B2* | 5/2012 | Rosemeier | B60K 6/52 |
| | | | | 475/150 |
| 8,308,600 | B2* | 11/2012 | Rosemeier | B60K 6/365 |
| | | | | 475/204 |
| 8,419,579 | B2* | 4/2013 | Rosemeier | B60K 6/48 |
| | | | | 475/150 |
| 8,663,051 | B2* | 3/2014 | Sten | F16H 48/36 |
| | | | | 475/205 |
| 9,777,816 | B2* | 10/2017 | Petersen | B60K 1/00 |
| 9,987,918 | B2* | 6/2018 | Haupt | B60K 1/00 |
| 2007/0087889 | A1* | 4/2007 | Rosemeier | B60K 17/344 |
| | | | | 475/205 |
| 2007/0123383 | A1* | 5/2007 | Yokoyama | B60K 6/365 |
| | | | | 475/5 |
| 2017/0059023 | A1* | 3/2017 | Severinsson | B60K 6/48 |
| 2018/0099561 | A1* | 4/2018 | Xu | B60K 1/02 |

* cited by examiner

DRIVING FORCE ADJUSTMENT APPARATUS

CROSS-REFERENCE TO THE RELATED APPLICATION

This application incorporates by references the subject matter of Japanese Patent Application No. 2017-043444 filed in Japan on Mar. 8, 2017 on which a priority claim is based under 35 U.S.C. § 119(a).

FIELD

The present invention relates to an apparatus that adjusts driving force of the left and right wheels of a vehicle.

BACKGROUND

Conventionally, a driving force adjustment apparatus is known in which a differential apparatus interposed between the left and right wheels of a vehicle and a planetary gear mechanism and a motor are combined such that distribution of the driving force (torque distribution) between the left and right wheels can be changed. In such a driving force adjustment apparatus as just described, the motor rotates passively in response to the difference between rotational speeds of the left and right wheels upon turning of the vehicle to absorb the rotational speed difference. Further, as the motor operates, the driving force difference between the left and right wheels increases or decreases to change the distribution of the driving force between the left and right wheels. On the other hand, if rotation of the motor is restrained, then the differential action is limited and the traction performance is improved (e.g. JP 2007-177915 A).

Since an existing driving force adjustment apparatus is structured such that a planetary gear mechanism is interposed on a rotational shaft of the left and right wheels, it has a subject that the dimension thereof in the vehicle widthwise direction is liable to increase and downsizing is difficult. Especially, such a driving force adjustment apparatus as disclosed in JP 2007-177915 A has a complicated structure in which two planetary gear mechanisms are disposed on an axle. Therefore, the size of the entire apparatus increases in the vehicle widthwise direction, which gives rise to degradation of the mountability. Further, since the length of the axle decreases, there is a demerit that this gives rise to degradation of the ground performance of the vehicle.

Further, in the existing driving force adjustment apparatus, since the motor rotates normally in response to the rotational speed difference between the left and right wheels, in a travelling state in which driving force distribution is not required, there is the possibility that power loss by unnecessary rotation of the motor may occur, resulting in degradation of the operation performance.

Further, the existing driving force adjustment has only a function for adjusting the driving force between the left and right wheels and, in order to obtain driving force for driving a vehicle using a motor, it is necessary to separately provide a motor for traveling and a reduction mechanism. Therefore, there is the possibility that further degradation of the mountability may be caused.

SUMMARY

Technical Problems

The present invention has been made in view of such a subject as described above, and it is an object of the present invention to provide a driving force adjustment apparatus in which the operation performance is improved by adjusting and applying driving force to and between the left and right wheels by a simple and compact structure.

Solution to Problems (1) In order to achieve the object described above, the driving force adjustment apparatus for a vehicle is disclosed herein. The vehicle includes three elements: a differential case; a left axle; and a right axle. The driving force adjustment apparatus includes a motor, and a differential apparatus including a differential gear supported on the differential case (differential apparatus case) and interposed between the left axle and the right axle.

The driving force adjustment apparatus further includes a planetary gear mechanism having three rotational shafts that includes a sun gear shaft, a ring gear shaft and a planetary carrier shaft disposed coaxially and adjusts a reduction ratio among the three rotational shafts. The driving force adjustment apparatus further includes a reduction gear that couples one of the three rotational shafts and the motor to each other.

The driving force adjustment apparatus further includes a first gear train that couples one shaft with the left axle or the right axle. The one shaft is one of two shafts which are not coupled to the reduction gear among the three rotational shafts. That is, the one shaft is not coupled to the reduction gear.

The driving force adjustment apparatus further includes a second gear train that couples another shaft with one of the three elements. The another shaft is the other one of the two shafts which are not coupled to the reduction gear among the three rotational shafts. That is, the another shaft is not coupled to the reduction gear directly. The one element is one of two elements which are not coupled to the first gear train among the three elements. That is, the one element is not coupled to the first gear train directly.

The planetary gear mechanism, first gear train and second gear train have first and second gear ratios. The first gear ratio is such that rotation of the motor stops when the differential apparatus does not perform differential operation. The second gear ratio is such that an increasing amount of driving force in one of the right axle and the left axle equals a decreasing amount of driving force in the other one of the right axle and the left axle, caused by driving of the motor.

The sun gear shaft is disposed at a position offset in a forward and rearward direction (a longitudinal direction) of a vehicle from the left axle and the right axle, and the motor is disposed atone side in a vehicle widthwise direction with reference to the differential apparatus, whereas the planetary gear mechanism is disposed at the other side in the vehicle widthwise direction.

Advantageous Effects

With the driving force adjustment apparatus disclosed herein, the entire apparatus can be downsized while a vehicle operation performance is enhanced. Especially, by offsetting the center of the planetary gear mechanism from the axles, the size of the axle in the vehicle widthwise direction can be reduced and downsizing of the vehicle can be facilitated, and the degree of freedom of the layout can be increased. Accordingly, the driving force adjustment apparatus can be easily provided in a vehicle that has a limited space margin like a compact car and the operation performance can be enhanced.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

1. Configuration

Figure 1:
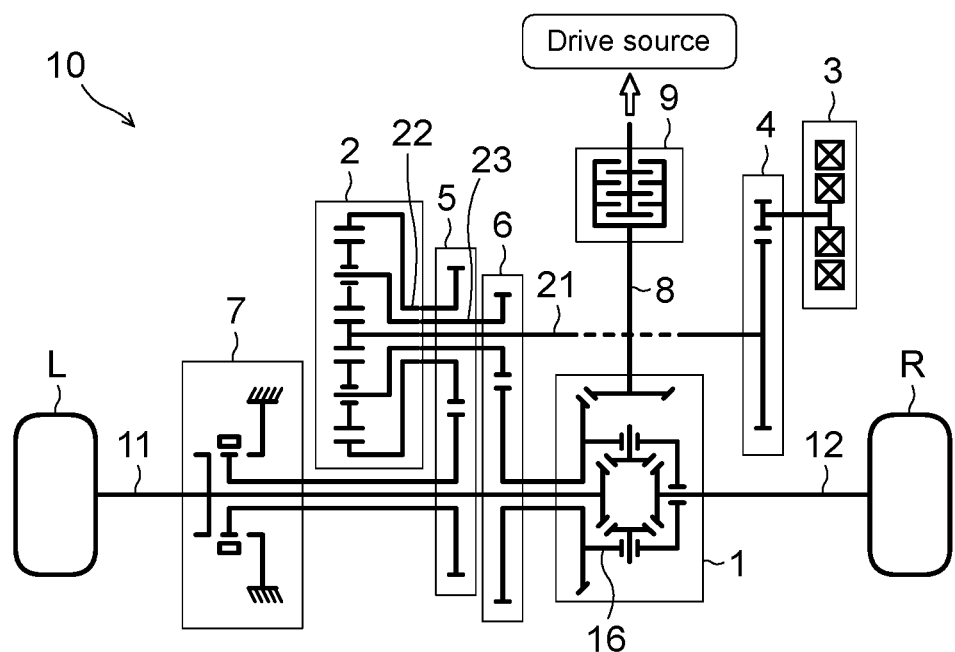
FIG. 1 is a skeleton diagram of a driving force adjustment apparatus as a working example.

In the following, a driving force adjustment apparatus 10 as an embodiment is described with reference to the drawings. The driving force adjustment apparatus 10 depicted in FIG. 1 has a function for distributing driving force transmitted from a driving source of a vehicle to left and right wheels, another function for absorbing a rotational speed difference between the left and right wheels which appears upon turning of the vehicle, a further function for positively adjusting the variation of the rotational speed difference to change the torque distribution, and a still further function for driving the vehicle to travel with a motor.

As a driving source of a vehicle in which the driving force adjustment apparatus 10 is incorporated, for example, a gasoline engine, a diesel engine, a traveling motor, a traveling motor generator and so forth are available. The wheel to which the driving force adjustment apparatus 10 is applied may be a front wheel or a rear wheel of the vehicle. The driving force adjustment apparatus 10 is interposed between a left wheel L and a right wheel R of the vehicle. In the driving force adjustment apparatus 10, a differential apparatus 1, a planetary gear mechanism 2, a motor 3, a reduction gear 4, a first gear train 5, a second gear train 6, a dog clutch 7 and an electronically controlled coupling 9 are provided.

Figure 2A:
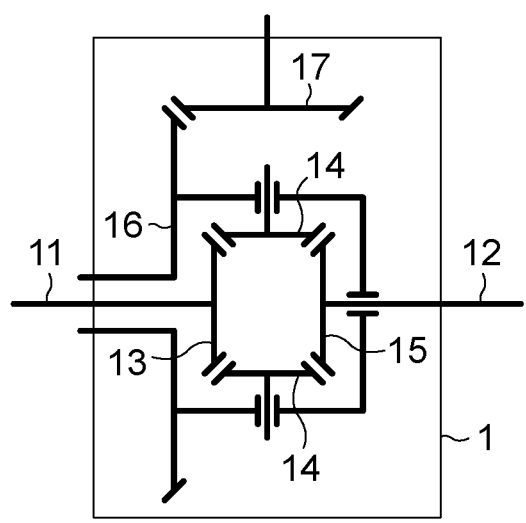
FIGS. 2(A) to 2(C) are skeleton diagrams depicting part of FIG. 1 in an enlarged scale.

The differential apparatus 1 is configured by interposing a differential gear supported on a differential case 16 (differential apparatus case) in the form of a container between a left axle 11 and a right axle 12. As depicted in FIG. 2(A), a left bevel gear 13 coupled to the left axle 11, differential pinions 14 (pinions of the differential apparatus 1) supported on the differential case 16, and a right bevel gear 15 coupled to the right axle 12 are accommodated in a mutually meshing state in the inside of the differential case 16. The left bevel gear 13, differential case 16 and right bevel gear 15 individually have structures (positions, shapes and numbers of gears) set such that they can transmit power to each other and the rotational speeds thereof are disposed linearly in this order on an alignment chart. An axis of rotation of the left bevel gear 13 and the right bevel gear 15 are disposed on the same straight line while an axis of rotation of the differential pinions 14 is disposed orthogonally to the straight line.

The differential case 16 is coupled to an input power shaft 8 through a conical gear 17 (bevel gear) such as a spiral bevel gear or a hypoid gear. The input power shaft 8 is a shaft to which driving force transmitted from a driving source of the vehicle is inputted. An electronically controlled coupling 9 of the multi plate clutch type is interposed on the input power shaft 8. The electronically controlled coupling 9 is used to arbitrarily set the transmission amount of torque within a range from 0% to 100% by increasing or decreasing the engaging force of clutch plates build therein. It is to be noted that, where the driving force of the vehicle is an engine and the distance between the differential apparatus 1 and the engine is great, a propeller shaft not depicted is coupled between the electronically controlled coupling 9 and the driving source of the vehicle. The propeller shaft extends in a vehicle forward and rearward direction (longitudinal direction) at a central location in the vehicle widthwise direction.

Figure 2B:
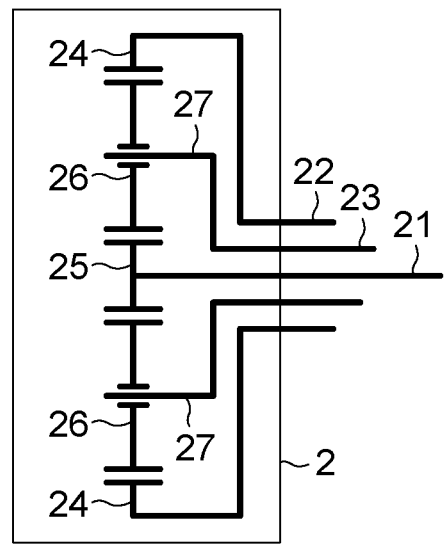

As depicted in FIG. 2(B), the planetary gear mechanism 2 is a transmission mechanism of the single pinion planetary gear type including a sun gear shaft 21, a ring gear shaft 22 and a planetary carrier shaft 23 disposed coaxially. An annular ring gear 24, a sun gear 25 disposed coaxially with the ring gear 24, a planetary gear 26 meshing with both of the ring gear 24 and the sun gear 25, and a carrier 27 that supports the center of rotation of the planetary gear 26 for coaxial rotation with the sun gear 25 are provided in the inside of the planetary gear mechanism 2.

The sun gear shaft 21 is a rotational shaft of the sun gear 25 and the ring gear shaft 22 is a rotational shaft of the ring gear 24. Further, the planetary carrier shaft 23 is a rotational shaft of the carrier 27 that supports the center of rotation of the planetary gear 26. The sun gear 25, carrier 27 and ring gear 24 individually have structures (positions, shapes and numbers of gears) set such that they can transmit power to each other and the rotational speeds thereof are disposed linearly in this order on an alignment chart. Further, the position of the center of the planetary gear mechanism 2 (the center of the sun gear shaft 21, ring gear shaft 22 and planetary carrier shaft 23) is disposed at a position offset from the left axle 11 and the right axle 12. The planetary gear mechanism 2 in the present embodiment is provided at a position offset in the vehicle forward direction from the axles 11 and 12 from the axles 11 and 12.

The motor 3 is an electric motor whose rotational speed (number of rotations) can be varied and generates driving force by consuming power. Power for driving the motor 3 is supplied from an on-vehicle battery not depicted. Further, rotational driving force of the motor 3 is controlled by an electronic controlling apparatus not depicted. For example, where the motor 3 is an AC motor, the rotational driving force of the motor 3 is controlled by the electronic controlling apparatus by the electronic controlling apparatus adjusting the frequency of AC power to be supplied to the motor 3. On the other hand, where the motor 3 is a DC motor (direct current motor), the rotational driving force of the motor 3 is controlled by the electronic controlling apparatus by the electronic controlling apparatus adjusting the current to be supplied to the motor 3.

The reduction gear 4 is interposed between the planetary gear mechanism 2 and the motor 3. The reduction gear 4 is a reduction mechanism for reducing the speed of the driving force of the motor 3 and increasing the torque. In the present embodiment, the reduction gear 4 is coupled to the sun gear shaft 21 of the planetary gear mechanism 2. However, the coupling destination of the reduction gear 4 may be set otherwise to the ring gear shaft 22 or may alternatively be set to the planetary carrier shaft 23. In this manner, the motor 3 is coupled to one of the three rotational shafts including the sun gear shaft 21, ring gear shaft 22 and planetary carrier shaft 23.

The motor 3 and the reduction gear 4 are disposed at the right side of the vehicle with reference to the differential apparatus 1. In contrast, the planetary gear mechanism 2 is disposed at the left side of the vehicle with reference to the differential apparatus 1. In particular, with reference to the differential apparatus 1, the motor 3 is disposed at one side in the vehicle widthwise direction and the planetary gear mechanism 2 is disposed at the other side in the vehicle widthwise direction. Further, the shaft that couples the planetary gear mechanism 2 and the reduction gear 4 to each other extends in the vehicle widthwise direction across the input power shaft 8.

In order to transmit driving force to the left wheel L and the right wheel R, two rotational shafts that are not coupled to the reduction gear 4 (motor 3) from among the three rotational shafts 21, 22 and 23 are coupled to one of the left axle 11, right axle 12 and differential case 16. In the example depicted in FIG. 1, the ring gear shaft 22 of the planetary gear mechanism. 2 is coupled to the left axle 11, and the planetary carrier shaft 23 is coupled to the differential case 16. Further, the first gear train 5 is interposed between the ring gear shaft 22 and the left axle 11, and the second gear train 6 is interposed between the planetary carrier shaft 23 and the differential case 16.

The first gear train 5 is a gear train for coupling one of the two rotational shafts, which are not coupled to the reduction gear 4 (motor 3), to the left axle 11 or the right axle 12. On the other hand, the second gear train 6 is a gear train for coupling the other one of the two rotational shafts, which is not coupled to the reduction gear 4 (motor 3), to one of two elements that are not coupled to the first gear train 5 from among three elements of the differential case 16, left axle 11 and right axle 12. Similarly to the reduction gear 4, the first gear train 5 and the second gear train 6 have a function for reducing the speed of the driving force of the planetary gear mechanism 2 and increasing the torque such that the increased torque is transmitted to the left wheel L and the right wheel R.

Further, the gear trains 5 and 6 have a function for reducing the rotational speed of the motor 3 to zero when the dog clutch 7 is in a second state hereinafter described and the left axle 11 and the right axle 12 have an equal rotational speed and another function for reducing the sum of the driving force variation amount (increased amount or decreased amount) of the left axle 11 and the driving force variation amount (decreased amount or increased amount) of the right axle 12 to zero. In particular, the gear ratio of the planetary gear mechanism 2, first gear train 5 and second gear train 6 is set to a ratio with which the motor 3 does not rotate when the differential apparatus 1 does not perform differential operation. In addition, the gear ratio is set to a ratio with which the total torque of the left axle 11 and the right axle 12 does not vary when torque of the motor 3 is applied to them.

Figure 2C:
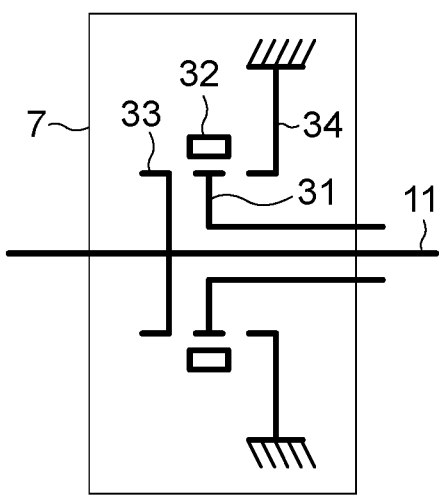

In the present embodiment, as depicted in FIG. 1, the dog clutch 7 (changeover mechanism) is interposed between the first gear train 5 and the left axle 11. As depicted in FIGS. 1, 2(B) and 2(C), a first hub 31, a sleeve 32, a second hub 33 and a fixing hub 34 (fixing element) are provided on the dog clutch 7. The first hub 31 is an engagement element that rotates in synchronism with the ring gear 24 through the first gear train 5. The sleeve 32 is provided at an outer periphery portion of the first hub 31 and provided for sliding movement in a parallel direction to the rotational shaft of the first hub 31. The second hub 33 is an engagement element fixed to the left axle 11. The fixing hub 34 is a member for rotation restraint and is fixed to a member that does not rotate (for example, to a clutch case).

A convex streak is formed on an outer peripheral face of each of the first hub 31, second hub 33 and fixing hub 34 is formed on an outer peripheral face of the first hub 31, second hub 33 and fixing hub 34 such that it extends in a parallel direction to an axis of the left axle 11 that is a rotational shaft. Meanwhile, a groove is formed on an inner peripheral face of the sleeve 32 such that it fits with the convex streaks. An engagement destination of the first hub 31 is changed over by slidably moving the sleeve 32 such that three different power transmission states are implemented. The first state is a state in which the first hub 31 engages with the fixing hub 34, and the second state is a state in which the first hub 31 engages with the second hub 33. Further, the third state is a state in which the sleeve 32 meshes only with the first hub 31 but does not engage with any of the second hub 33 and the fixing hub 34.

2. Action

Figure 3A:
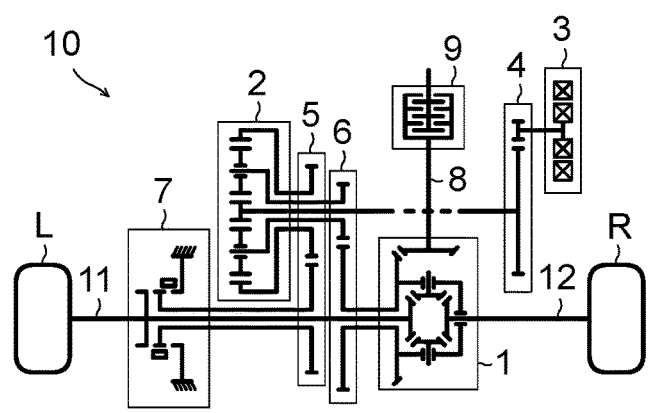
FIGS. 3(A) and 3(B) are views illustrating a first state of a dog clutch.
Figure 3B:
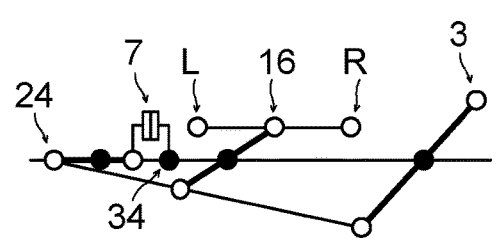

FIG. 3 is a skeleton diagram and an alignment chart when the dog clutch 7 is in the first state. In the first state, since the sleeve 32 is engaged with the fixing hub 34, the ring gear 24 of the planetary gear mechanism 2 is fixed and the driving force of the motor 3 is transmitted only to the differential case 16. Consequently, the vehicle can be driven by the motor 3 (namely, motor traveling). At this time, driving force distribution between the left wheel L and the right wheel R by the differential apparatus 1 can be carried out.

Figure 4A:
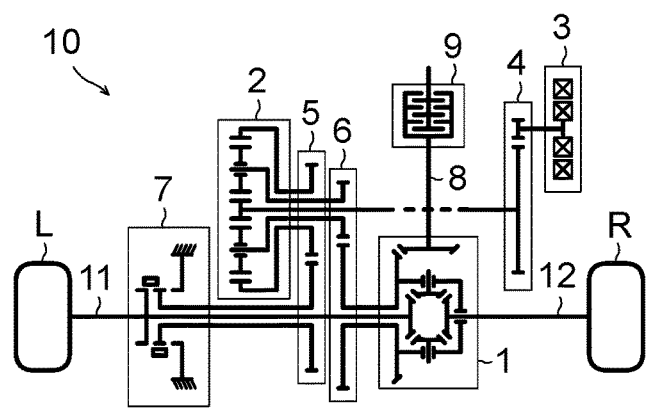
FIGS. 4(A) and 4(B) are views illustrating a second state of the dog clutch.
Figure 4B:
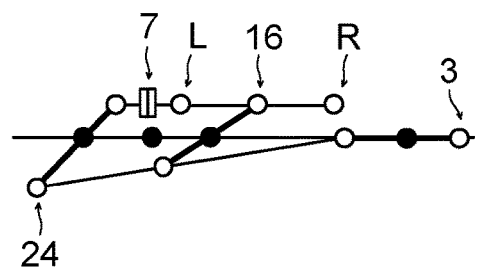

FIG. 4 is a skeleton diagram and an alignment chart when the dog clutch 7 is in the second state. In the second state, since the sleeve 32 is engaged with the second hub 33, the driving force of the motor 3 acts so as to increase or reduce the driving force of the differential case 16 and the left axle 11. Accordingly, not only driving force distribution between the left wheel L and the right wheel R by the differential apparatus 1 but also driving force distribution between the left wheel L and the right wheel R according to the driving force of the motor 3 (namely, arbitrary left and right torque movement) can be implemented, and the operation performance of the vehicle can be improved.

Figure 5A:
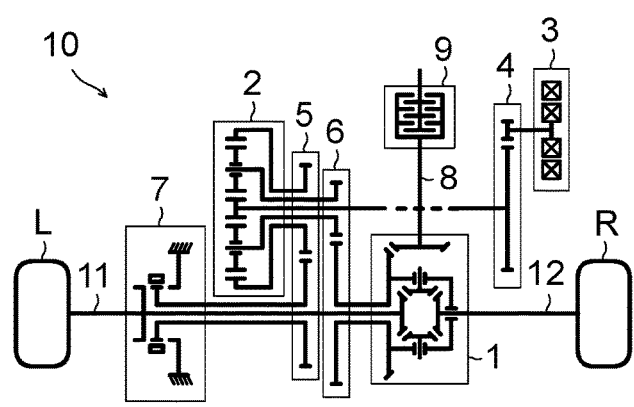
FIGS. 5(A) and 5(B) are views illustrating a third state of the dog clutch.
Figure 5B:
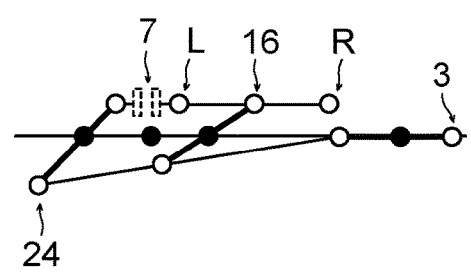

FIG. 5 is a skeleton diagram and an alignment chart when the dog clutch 7 is in the third state. In the third state, the sleeve 32 engages with none of the second hub 33 and the fixing hub 34, and the first hub 31 idles (is free) with respect to (from) the left axle 11. Consequently, the motor 3 is decoupled completely and driving force distribution between the left wheel L and the right wheel R by the differential apparatus 1 is performed. At this time, since friction loss for rotationally driving the motor 3 and the planetary gear mechanism 2 is reduced, the traveling efficiency of the vehicle increases.

3. Advantageous Effect (1) By offsetting the center of the planetary gear mechanism 2 from the axles 11 and 12, the size of the axles 11 and 12 in the vehicle widthwise direction can be reduced and downsizing of the vehicle can be facilitated, and the degree of freedom of the layout and the ground performance can be improved. Further, since the motor 3 does not rotate when the differential apparatus 1 does not perform differential operation, power loss of the motor 3 can be reduced and degradation of the operation performance of the vehicle can be suppressed. Furthermore, since the total torque of the left axle 11 and the right axle 12 does not vary when torque of the motor 3 is applied, the control performance can be enhanced and the operation performance of the vehicle can be improved.

Further, by disposing the motor 3 at the right side of the vehicle with reference to the differential apparatus 1 and disposing the planetary gear mechanism 2 at the left side opposite to the side of the motor 3 as depicted in FIG. 1, the weight balance in the leftward and rightward direction of the vehicle can be made better and the differential apparatus 1 can be provided in the proximity of the center in the vehicle widthwise direction. Therefore, degradation of the vehicle ground performance arising from a difference between the lengths of the axles of the left and right wheels can be suppressed. Further, by disposing the motor 3 through the reduction gear 4, a motor having low driving force can be used for the motor 3 (for example, the traveling motor can be omitted), and therefore, increase of the size of a motor controlling apparatus not depicted can be suppressed.

Accordingly, downsizing of the overall apparatus can be implemented with a simple and compact structure, and driving force of the left wheel L and right wheel R can be adjusted and applied to improve the operation performance.

(2) By providing the changeover mechanism (dog clutch 7) between the first gear train 5 and the left axle 11, changeover between the state in which driving force distribution between the left wheel L and the right wheel R by the differential apparatus 1 is performed and the state in which left and right torque distribution utilizing the motor 3 is implemented in addition to the state described above can be performed as depicted in FIGS. 4 and 5. For example, not only the driving force of the left and right wheels can be adjusted by the single motor 3 but also the motor 3 can be placed into a state in which it is decoupled or another state in which the motor 3 can generate driving force for driving the vehicle to travel, and the operation performance of the vehicle can be enhanced. Accordingly, since the motor 3 can be rotated or stopped irrespective of presence or absence of differential operation of the differential apparatus 1 upon traveling of the vehicle in which left and right torque distribution by the motor 3 is unnecessary, loss arising from rotation of the motor 3 can be suppressed and degradation of the operation performance can be suppressed.

(3) Where a configuration is applied in which three different power transmission states are controlled by the dog clutch 7, motor driving of the vehicle can be implemented as depicted in FIG. 3. The motor driving can be carried out in response to a traveling state of the vehicle, selection of a driver or the like, and the usability can be enhanced further.

(4) By coupling the input power shaft 8 in which the electronically controlled coupling 9 is interposed to the differential apparatus 1 as depicted in FIG. 1, a four-wheel driving system of the on-demand type can be implemented. In particular, it is facilitated to apply a function for left and right torque movement to the four-wheel driving system of the on-demand type.

Further, by combining the four-wheel driving system of the on-demand type with the dog clutch 7, traveling by the motor 3 (namely, EV traveling) can be implemented while the power source is stopped, and the vehicle fuel efficiency can be enhanced.

4. Modifications

The embodiment described above is illustrative to the end, and there is no intention to eliminate various modifications and applications of the technology not specified in the embodiment described above. Various variations and modifications to the components of the present embodiment can be made without departing from the scope of the present embodiment. Further, selection and choice can be made as occasion demands or the components described above can be combined suitably.

Figure 6:
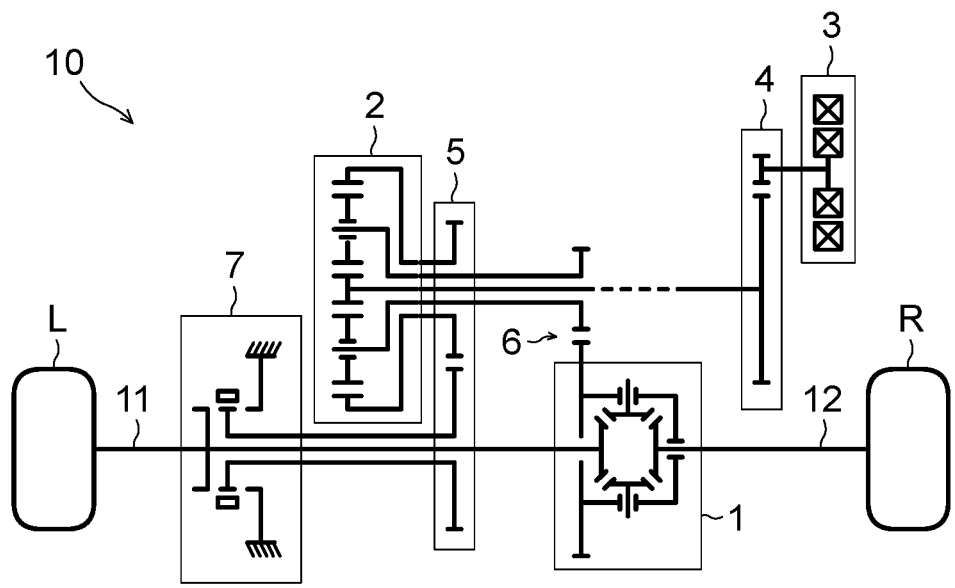
FIGS. 6 to 9 are skeleton diagrams of driving force adjustment apparatus as modifications.

As depicted in FIG. 6, the driving force adjustment apparatus 10 may be structured such that, assuming 4WD (four-wheel drive) rear differential driving of an electric vehicle, the input power shaft 8 or the electronically controlled coupling 9 coupled to the differential apparatus 1 is omitted. Also where a driving source is not coupled to the differential case 16, a structure that exhibits an advantageous effect similar to that of the embodiment described above is obtained can be implemented.

Figure 7:
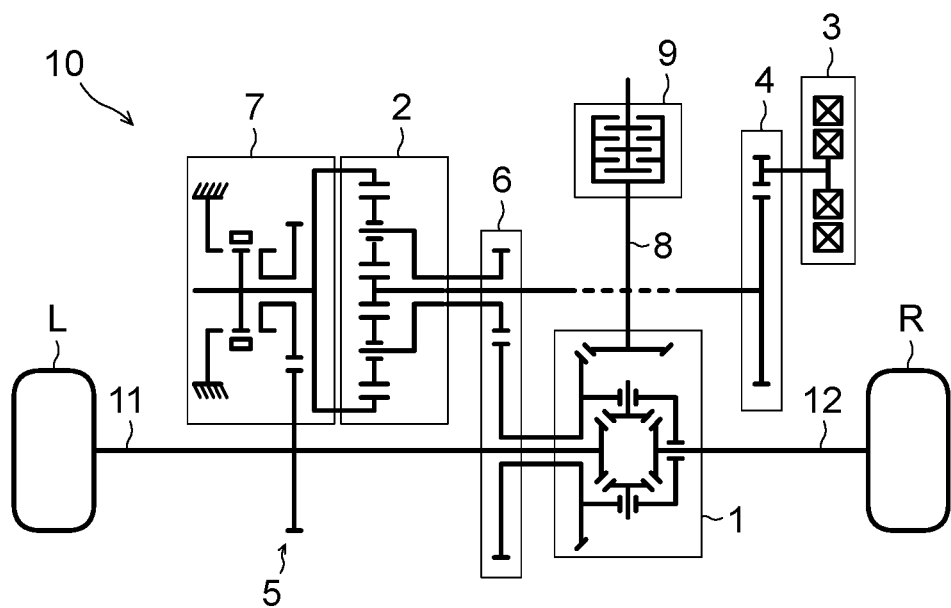

The dog clutch 7 may be disposed aligningly at the central position of the planetary gear mechanism 2 as depicted in FIG. 7. That is, an axis of rotation of the dog clutch 7 is aligned with an axis of the planetary gear mechanism 2. In particular, the axis of rotation of the dog clutch 7 is provided at a position offset forwardly of the vehicle with respect to the axles 11 and 12 and is disposed coaxially with the sun gear shaft 21 (ring gear shaft 22, planetary carrier shaft 23) of the planetary gear mechanism 2. By aligning the center of rotation of the dog clutch 7 with the center of rotation of the planetary gear mechanism 2, the size of the axles 11 and 12 in the vehicle widthwise direction can be reduced, and consequently, downsizing of the vehicle can be facilitated and the degree of freedom of the layout can be increased.

Figure 8:
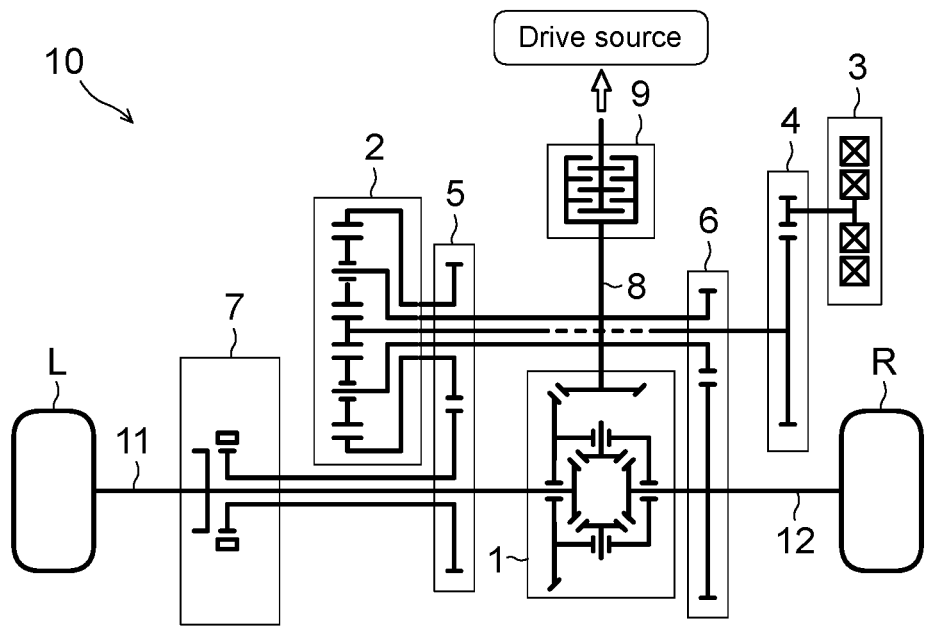

Although, in the embodiment described above, the ring gear shaft 22 and the planetary carrier shaft 23 (two rotational shafts not coupled to the motor 3) of the planetary gear mechanism 2 are coupled to the left axle 11 and the differential case 16, respectively, the coupling destination of the rotational shafts can be set to the left axle 11 and the right axle 12. In the example of FIG. 8, the ring gear shaft 22 of the planetary gear mechanism 2 is coupled to the left axle 11 and the planetary carrier shaft 23 is coupled to the right axle 12. Since the numbers of rotation of the left axle 11, differential case 16 and right axle 12 have a collinear relationship thereamong, by changing the coupling destination in response to the position, shape, number of teeth or the like of them, a structure that can achieve an advantageous effect similar to that of the embodiment described above can be implemented.

Figure 9:
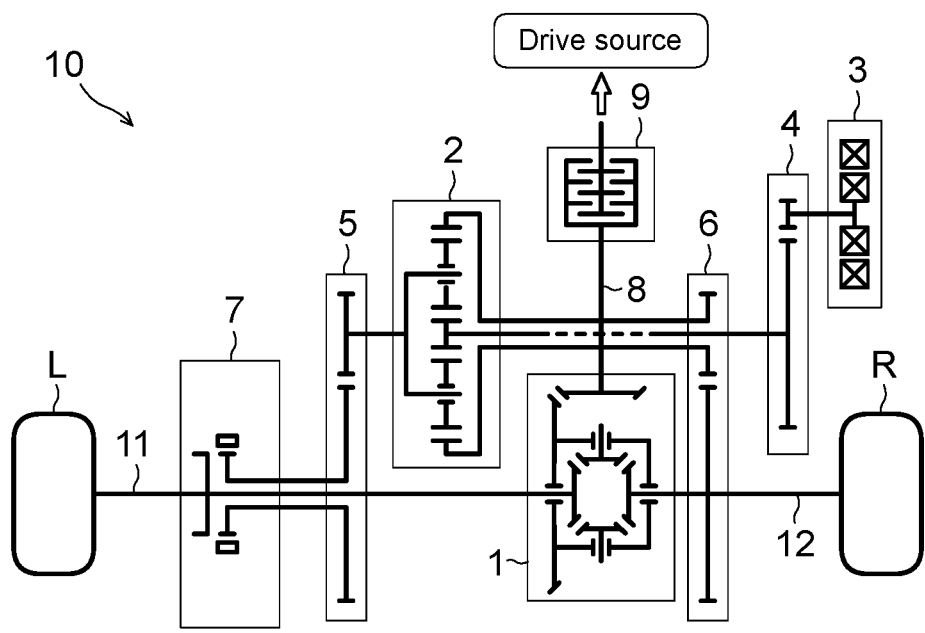

Further, while, in the embodiment described hereinabove, the first gear train 5 is interposed between the ring gear shaft 22 and the left axle 11 and the second gear train 6 is interposed between the planetary carrier shaft 23 and the differential case 16, also it is possible to exchange the coupling sources of the first gear train 5 and the second gear train 6 for each other. In the example depicted in FIG. 9, the first gear train 5 is interposed between the planetary carrier shaft 23 and the left axle 11 and the second gear train 6 is interposed between the ring gear shaft 22 and the differential case 16. Since the numbers of rotation of the sun gear shaft 21, planetary carrier shaft 23 and ring gear shaft 22 have a collinear relationship thereamong, by reversing the gear trains 5 and 6 of the coupling destinations in response to the position, shape, number of teeth or the like of them, a structure that can achieve an effect similar to that of the embodiment described above can be implemented.

The invention thus described, it will be obvious that the same may be varied in many ways. Such variations are not to be regarded as a departure from the scope of the invention, and all such modifications as would be obvious to one skilled in the art are intended to be included within the scope of the following claims.

REFERENCE SIGNS LIST 1 differential apparatus
2 planetary gear mechanism
3 motor
4 reduction gear
5 first gear train
6 second gear train
7 dog clutch (changeover mechanism)
8 input power shaft
9 electronically controlled coupling
10 driving force adjustment apparatus
11 left axle
12 right axle
13 left bevel gear
14 differential pinion
15 right bevel gear
16 differential case
17 conical gear
21 sun gear shaft
22 ring gear shaft
23 planetary carrier shaft
24 ring gear
25 sun gear
26 planetary gear
27 carrier
31 first hub
32 sleeve
33 second hub
34 fixing hub (fixing element)
L left wheel
R right wheel

The invention claimed is:

1. A driving force adjustment apparatus for a vehicle, the vehicle including three elements of a differential case, a left axle and a right axle, the driving force adjustment apparatus comprising:
   a motor;
   a differential apparatus including a differential gear supported on the differential case and interposed between the left axle and the right axle;
   a planetary gear mechanism having three rotational shafts that includes a sun gear shaft, a ring gear shaft and a planetary carrier shaft disposed coaxially and adjusts a reduction ratio among the three rotational shafts;
   a reduction gear that couples one of the three rotational shafts and the motor;
   a first gear train that couples one shaft with the left axle or the right axle, the one shaft being one of two shafts which are not coupled to the reduction gear among the three rotational shafts;
   a second gear train that couples another shaft with one of the three elements, the another shaft being the other one of the two shafts which are not coupled to the reduction gear among the three rotational shafts, and the one element being one of two elements which are not coupled to the first gear train among the three elements; and
   a changeover mechanism that is interposed between the first gear train and the left axle or the right axle and controls a power transmission state,
   wherein the planetary gear mechanism, first gear train and second gear train have first and second gear ratios, the first gear ratio being such that rotation of the motor stops when the differential apparatus does not perform differential operation, and the second gear ratio being such that an increasing amount of driving force in one of the right axle and the left axle equals a decreasing amount of driving force in the other one of the right axle and the left axle, caused by driving of the motor;
   the sun gear shaft is disposed at a position offset in a longitudinal direction of a vehicle from the left axle and the right axle;
   the motor is disposed at one side in a vehicle widthwise direction with reference to the differential apparatus, whereas the planetary gear mechanism is disposed at the other side in the vehicle widthwise direction; and
   the changeover mechanism is disposed coaxially with the left axle or the right axle.

2. The driving force adjustment apparatus according to claim 1, wherein the changeover mechanism controls the power transmission state to one of a first state in which the first gear train is fixed to a fixing element, a second state in which the first gear train is coupled to the left axle or the right axle and a third state in which the first gear train does not engage with any of the left axle and the right axle.

3. The driving force adjustment apparatus according to claim 2, further comprising:
   an input power shaft that couples a drive source of the vehicle with the differential case to each other; and
   an electronically controlled coupling interposed on the input power shaft.

4. The driving force adjustment apparatus according to claim 1, further comprising:
   an input power shaft that couples a drive source of the vehicle with the differential case to each other; and
   an electronically controlled coupling interposed on the input power shaft.

* * * * *